(12) United States Patent
Murakami

(10) Patent No.: US 12,401,219 B2
(45) Date of Patent: Aug. 26, 2025

(54) SOLAR CHARGING SYSTEM, METHOD, AND VEHICLE

(71) Applicant: TOYOTA JIDOSHA KABUSHIKI KAISHA, Toyota (JP)

(72) Inventor: Yukinori Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 622 days.

(21) Appl. No.: 17/815,986

(22) Filed: Jul. 29, 2022

(65) Prior Publication Data

US 2023/0061114 A1 Mar. 2, 2023

(30) Foreign Application Priority Data

Aug. 30, 2021 (JP) ................. 2021-139804

(51) Int. Cl.
*H02J 7/35* (2006.01)
*B60L 53/51* (2019.01)
*H02M 1/32* (2007.01)
*H02M 3/158* (2006.01)

(52) U.S. Cl.
CPC ............... *H02J 7/35* (2013.01); *B60L 53/51* (2019.02); *H02M 1/32* (2013.01); *H02M 3/158* (2013.01); *B60L 2210/10* (2013.01); *H02J 2207/20* (2020.01)

(58) Field of Classification Search
CPC ......... H02J 7/35; H02J 2207/20; B60L 53/51; B60L 2210/10; B60L 2240/529; B60L 3/0023; B60L 8/003; H02M 1/32; H02M 3/158; H02M 3/1584
USPC ................................ 320/101; 136/244, 252
See application file for complete search history.

(56) References Cited

U.S. PATENT DOCUMENTS

| | | | | |
|---|---|---|---|---|
| 9,071,154 | B2* | 6/2015 | Iwata | B60L 8/003 |
| 11,325,495 | B2* | 5/2022 | Jung | B60L 8/003 |
| 2020/0136393 | A1 | 4/2020 | Satake | |
| 2021/0078428 | A1* | 3/2021 | Jung | B60L 58/20 |
| 2022/0396167 | A1* | 12/2022 | Sharifipour | B60L 53/51 |

FOREIGN PATENT DOCUMENTS

| | | | | |
|---|---|---|---|---|
| EP | 3412491 A1 | * | 12/2018 | ........... B60L 1/00 |
| JP | 2019135887 A | | 8/2019 | |
| JP | 2020067812 A | | 4/2020 | |
| JP | 2021087291 A | | 6/2021 | |

* cited by examiner

*Primary Examiner* — M Baye Diao
(74) *Attorney, Agent, or Firm* — Dickinson Wright, PLLC

(57) ABSTRACT

A solar charging system includes a solar panel, a first power conversion device configured to receive electric power generated by the solar panel and detect or derive an input electric power and an output electric power of the first power conversion device, and a second power conversion device configured to receive electric power output from the first power conversion device and detect or derive an input electric power and an output electric power of the second power conversion device.

10 Claims, 5 Drawing Sheets

SOLAR CHARGING SYSTEM, METHOD, AND VEHICLE

CROSS-REFERENCE TO RELATED APPLICATION

This application claims priority to Japanese Patent Application No. 2021-139804 filed on Aug. 30, 2021, incorporated herein by reference in its entirety.

BACKGROUND

1. Technical Field

The disclosure relates to a solar charging system, a method, and a vehicle.

2. Description of Related Art

Japanese Unexamined Patent Application Publication No. 2021-087291 (JP 2021-087291 A) describes a solar charging system that includes two solar panels, two solar DC-DC converters respectively provided in correspondence with the solar panels, a high-voltage DC-DC converter that supplies a high-voltage battery with electric power output from the solar DC-DC converters, and an auxiliary DC-DC converter that supplies an auxiliary battery with electric power output from the solar DC-DC converters.

SUMMARY

In the system that includes the plurality of DC-DC converters, described in JP 2021-087291 A, when there is an abnormality in the system, it is desired to be able to identify the DC-DC converter associated with a location where the abnormality is.

The disclosure provides a solar charging system, a method, and a vehicle that are capable of, when there is an abnormality in the system, identifying the DC-DC converter in which there is the abnormality.

An aspect of the disclosure provides a solar charging system. The solar charging system includes a solar panel, a first power conversion device, and a second power conversion device. The first power conversion device is configured to receive electric power generated by the solar panel and detect or derive an input electric power and an output electric power of the first power conversion device. The second power conversion device is configured to receive electric power output from the first power conversion device and detect or derive an input electric power and an output electric power of the second power conversion device.

Another aspect of the disclosure provides a method that is executed by a solar charging system. The solar charging system includes a solar panel, a first DC-DC converter configured to receive electric power generated by the solar panel, a second DC-DC converter configured to detect or derive an input electric power and an output electric power of the second DC-DC converter and to output electric power, input from the first DC-DC converter, to a first battery, and a third DC-DC converter configured to detect or derive an output electric power of the third DC-DC converter and to output electric power, input from the first DC-DC converter, to a second battery. The method includes, when an abnormality has occurred in the solar charging system, identifying a location of the abnormality based on an input electric power and an output electric power of the first DC-DC converter, the input electric power and the output electric power of the second DC-DC converter, and the input electric power and the output electric power of the third DC-DC converter.

Further another aspect of the disclosure provides a vehicle including the solar charging system according to the above aspect.

With the solar charging system, method, and vehicle according to the aspects of the disclosure, when there is an abnormality in the system, it is possible to identify a location of the abnormality in the power conversion device (DC-DC converter).

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A solar charging system according to the aspect of the disclosure improves the operating rate and reliability of the system by, when there is an abnormality (an abnormality has occurred) in the system, accurately identifying a location of the abnormality based on, for example, a balance between input and output electric powers of each of DC-DC converters. Hereinafter, an embodiment of the disclosure will be described in detail with reference to the accompanying drawings.

Embodiment

Configuration

Figure 1:
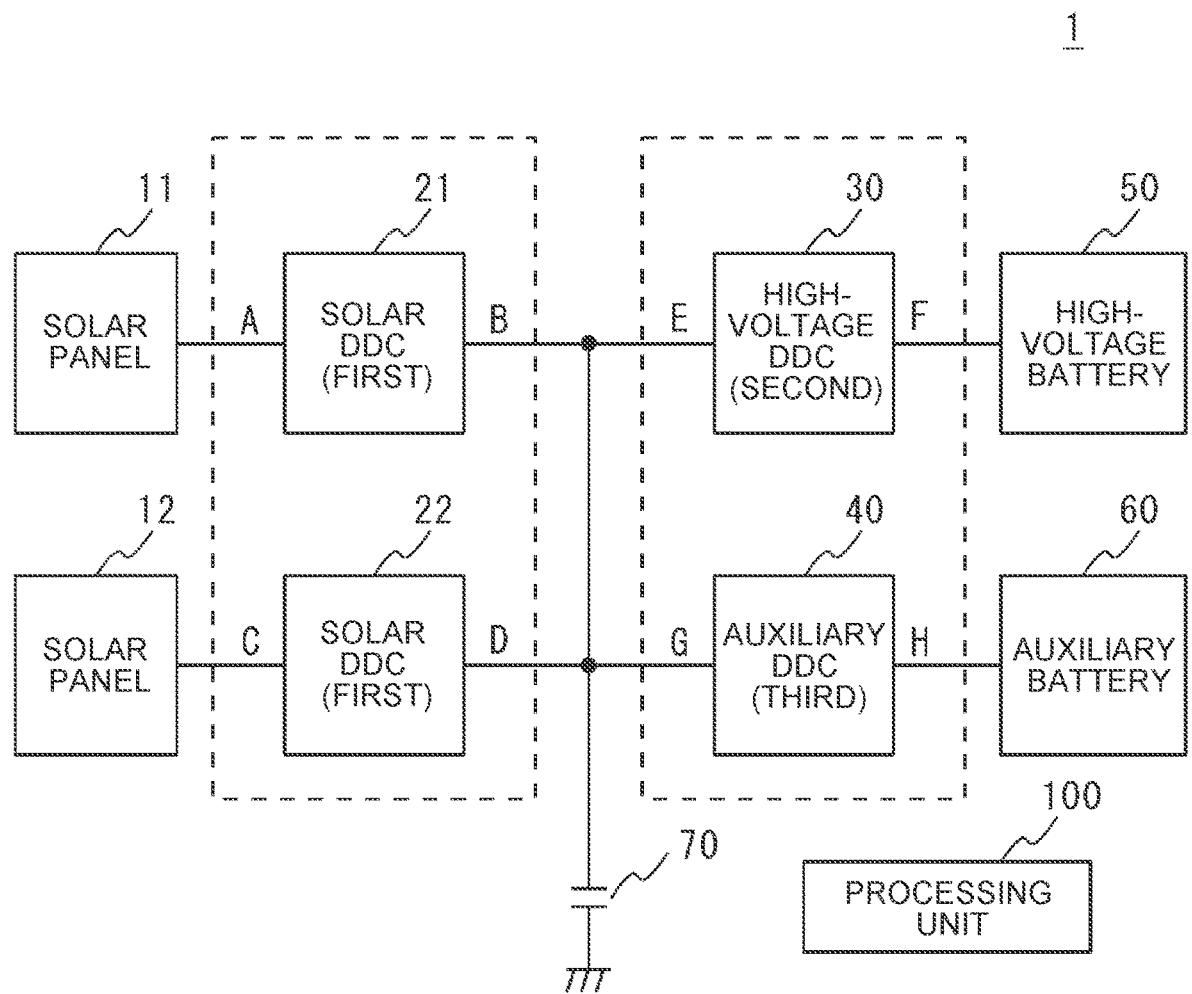
FIG. 1 is a schematic configuration diagram of a solar charging system according to an embodiment.

FIG. 1 is a block diagram showing the schematic configuration of a solar charging system according to the embodiment of the disclosure. The solar charging system 1 illustrated in FIG. 1 includes two solar panels 11, 12, two solar DDCs 21, 22, a high-voltage DDC 30, an auxiliary DDC 40, a high-voltage battery 50, an auxiliary battery 60, a capacitor 70, and a processing unit 100. The solar charging system 1 may be mounted on a vehicle or the like.

Each of the solar panels 11, 12 is a power generation apparatus that generates electric power upon receiving irradiation with sunlight and is typically a solar cell module that is a collection of solar cells. The solar panels 11, 12 may be installed on, for example, a roof, or the like, of a vehicle. The solar panel 11 is connected to the solar DDC 21 (described later), and electric power generated by the solar panel 11 is output to the solar DDC 21. The solar panel 12 is connected to the solar DDC 22 (described later), and electric power generated by the solar panel 12 is output to the solar DDC 22. The solar panel 11 and the solar panel 12 may have the same performance, capacity, size, shape, and the like or may be partially or totally different.

The solar DDCs 21, 22 are respectively provided in correspondence with the solar panels 11, 12. Each of the solar DDCs 21, 22 is a DC-DC converter (first DC-DC converter) that supplies the high-voltage DDC 30 and the auxiliary DDC 40 with electric power generated by a corresponding one of the solar panels 11, 12. When the solar DDC 21 supplies electric power, the solar DDC 21 is capable of converting (stepping up or stepping down) a power generation voltage of the solar panel 11, which is an input voltage, to a predetermined voltage and outputting the voltage to the high-voltage DDC 30 and the auxiliary DDC 40. When the solar DDC 22 supplies electric power, the solar DDC 22 is capable of converting (stepping up or stepping down) a power generation voltage of the solar panel 12, which is an input voltage, to a predetermined voltage and outputting the voltage to the high-voltage DDC 30 and the auxiliary DDC 40. In this way, each of the solar DDCs 21, 22 functions as a first power conversion device capable of converting an input electric power from a corresponding one of the solar panels 11, 12 to a desired output electric power. The solar DDC 21 includes a component (not shown) capable of detecting or deriving an electric power at an input side [A] to which the solar panel 11 is connected and an electric power at an output side [B] to which the high-voltage DDC 30 and the auxiliary DDC 40 are connected. The solar DDC 22 includes a component (not shown) capable of detecting or deriving an electric power at an input side [C] to which the solar panel 12 is connected and an electric power at an output side [D] to which the high-voltage DDC 30 and the auxiliary DDC 40 are connected. These electric powers are able to be obtained by, for example, detecting input and output electric powers of each of the solar DDCs 21, 22 with an electric power sensor (not shown) or deriving input and output electric powers from input and output voltages and input and output currents of each of the solar DDCs 21, 22, detected with a voltage sensor (not shown) and a current sensor (not shown). The configurations and performances of the solar DDCs 21, 22 may be the same or may be varied in accordance with the solar panels 11, 12.

Among the solar panels 11, 12 and the solar DDCs 21, 22, the solar panel 11 and the solar DDC 21 make up one panel power generation control unit, and the solar panel 12 and the solar DDC 22 make up one panel power generation control unit. In the solar charging system 1 of the present embodiment, the configuration in which the two panel power generation control units are provided in parallel will be described as an example. A solar charging system may be configured such that only one panel power generation control unit is provided or three or more panel power generation control units are provided.

The high-voltage DDC 30 is a DC-DC converter (second DC-DC converter) that supplies electric power output from the solar DDCs 21, 22 to the high-voltage battery 50. When the high-voltage DDC 30 supplies electric power, the high-voltage DDC 30 is capable of converting (stepping up) an output voltage of the solar DDCs 21, 22, which is an input voltage, to a predetermined voltage and outputting the voltage to the high-voltage battery 50. The high-voltage DDC 30 includes a component (not shown) capable of detecting or deriving an electric power at an input side [E] to which the solar DDCs 21, 22 are connected and an electric power at an output side [F] to which the high-voltage battery 50 is connected. The electric powers are able to be obtained by, for example, detecting input and output electric powers of the high-voltage DDC 30 with an electric power sensor (not shown) or deriving input and output electric powers from input and output voltages and input and output currents of the high-voltage DDC 30, detected with a voltage sensor (not shown) and a current sensor (not shown).

The auxiliary DDC 40 is a DC-DC converter (third DC-DC converter) that supplies electric power output from the solar DDCs 21, 22 to the auxiliary battery 60. When the auxiliary DDC 40 supplies electric power, the auxiliary DDC 40 is capable of converting (stepping down) an output voltage of the solar DDCs 21, 22, which is an input voltage, to a predetermined voltage and outputting the voltage to the auxiliary battery 60. The auxiliary DDC 40 of the present embodiment is made up of two or more converter circuits connected in parallel in order to increase outputtable power capacity.

Figure 2:
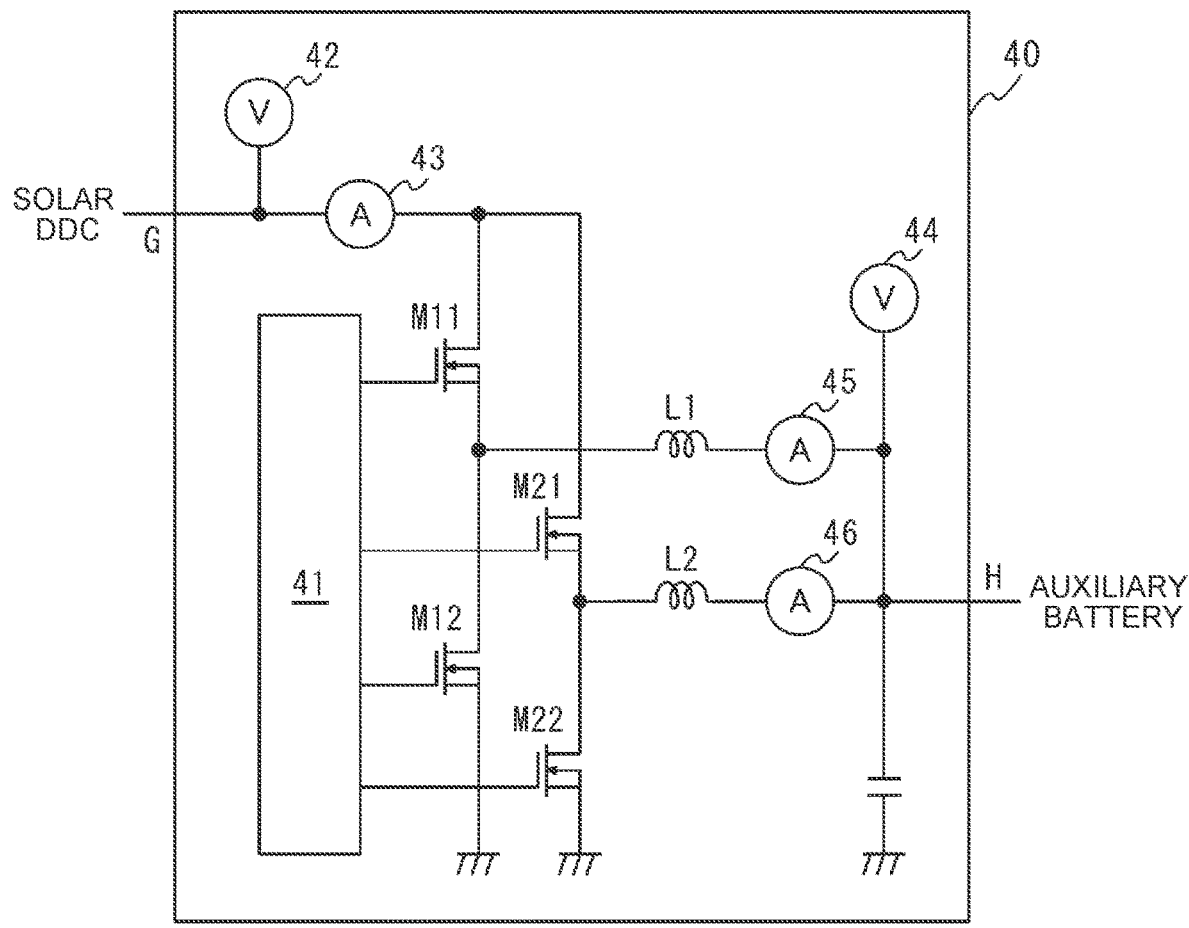
FIG. 2 is an example of a circuit of an auxiliary DDC.

FIG. 2 shows an example of the detailed circuit of the auxiliary DDC 40 made up of the two converter circuits connected in parallel. In the auxiliary DDC 40 illustrated in FIG. 2, a first converter circuit made up of a switching element M11, a switching element M12, and an inductor L1 and a second converter circuit made up of a switching element M21, a switching element M22, and an inductor L2 are connected in parallel. The on-off operation of each of the switching elements M11, M12, M21, M22 is controlled by a drive circuit 41. The auxiliary DDC 40 includes an input voltage sensor 42, an input current sensor 43, an output voltage sensor 44, a first output current sensor 45, and a second output current sensor 46. The input voltage sensor 42 detects a voltage at the input side [G]. The input current sensor 43 detects a current flowing from the input side [G] into the circuit. The output voltage sensor 44 detects a voltage at the output side [H]. The first output current sensor 45 detects a current flowing out from the first converter circuit toward the output side [H]. The second output current sensor 46 detects a current flowing out from the second converter circuit toward the output side [H]. The values of voltages and currents respectively detected by these sensors or the value of electric power at the input side [G] and the value of electric power at the output side [H], derived from the voltages and the currents, are output to the processing unit 100. The input current sensor 43 may be omitted when a second example of an abnormality control process (described later) is executed.

Each of the high-voltage DDC 30 and the auxiliary DDC 40 functions as a second power conversion device capable of converting an input electric power from the solar DDCs 21, 22 that each are the first power conversion device to a desired output electric power.

The high-voltage battery 50 is, for example, a rechargeable secondary battery, such as a lithium ion battery and a nickel-metal hydride battery. The high-voltage battery 50 is connected to the high-voltage DDC 30 so as to be chargeable with electric power output from the high-voltage DDC 30. The high-voltage battery 50 mounted on a vehicle may be, for example, a so-called drive battery capable of supplying electric power required for the operation of a main device (not shown) for driving the vehicle, such as a starter motor and an electric motor.

The auxiliary battery 60 is, for example, a rechargeable secondary battery, such as a lithium ion battery and a lead acid battery. The auxiliary battery 60 is connected to the auxiliary DDC 40 so as to be chargeable with electric power output from the auxiliary DDC 40. The auxiliary battery 60 mounted on a vehicle is a battery capable of supplying electric power required for the operations of auxiliary devices (not shown) other than for driving the vehicle, including lamps, such as a head lamp and an interior lamp, air conditioners, such as a heater and a cooler, and devices for autonomous driving and advanced driving assistance.

The capacitor 70 is connected between the solar DDCs 21, 22 (first power conversion device) and both the high-voltage DDC 30 and the auxiliary DDC 40 (second power conversion device). The capacitor 70 is a large-capacity capacitive element used to, for example, charge and discharge electric power generated at the solar panels 11, 12 as needed or stabilize the voltage generated between the output of the solar DDCs 21, 22 and the input of both the high-voltage DDC 30 and the auxiliary DDC 40. The capacitor 70 may be omitted from the components of the solar charging system 1.

The processing unit 100 acquires a detected input electric power (or a detected input voltage and a detected input current for derivation) and a detected output electric power (or a detected output voltage and a detected output current for derivation) from each of the solar DDC 21, the solar DDC 22, the high-voltage DDC 30, and the auxiliary DDC 40. When there is an abnormality in the solar charging system 1, the processing unit 100 identifies the DC-DC converter in which there is an abnormality (sensor abnormality, circuit abnormality, or the like) based on the input electric power and the output electric power acquired from each of the solar DDC 21, the solar DDC 22, the high-voltage DDC 30, and the auxiliary DDC 40.

One or some or all of the solar DDCs 21, 22, the high-voltage DDC 30, the auxiliary DDC 40, and the processing unit 100 can be configured as an electronic control unit (ECU) that typically includes a processor, a memory, an input/output interface, and the like. The electronic control unit is capable of executing the above-described various controls by the processor reading programs stored in the memory and running the programs.

Control

Next, some examples of an abnormality control process that is executed by the solar charging system 1 when there is an abnormality in the solar charging system 1 will be described further with reference to FIG. 3 to FIG. 5.

(1) First Example

Figure 3:
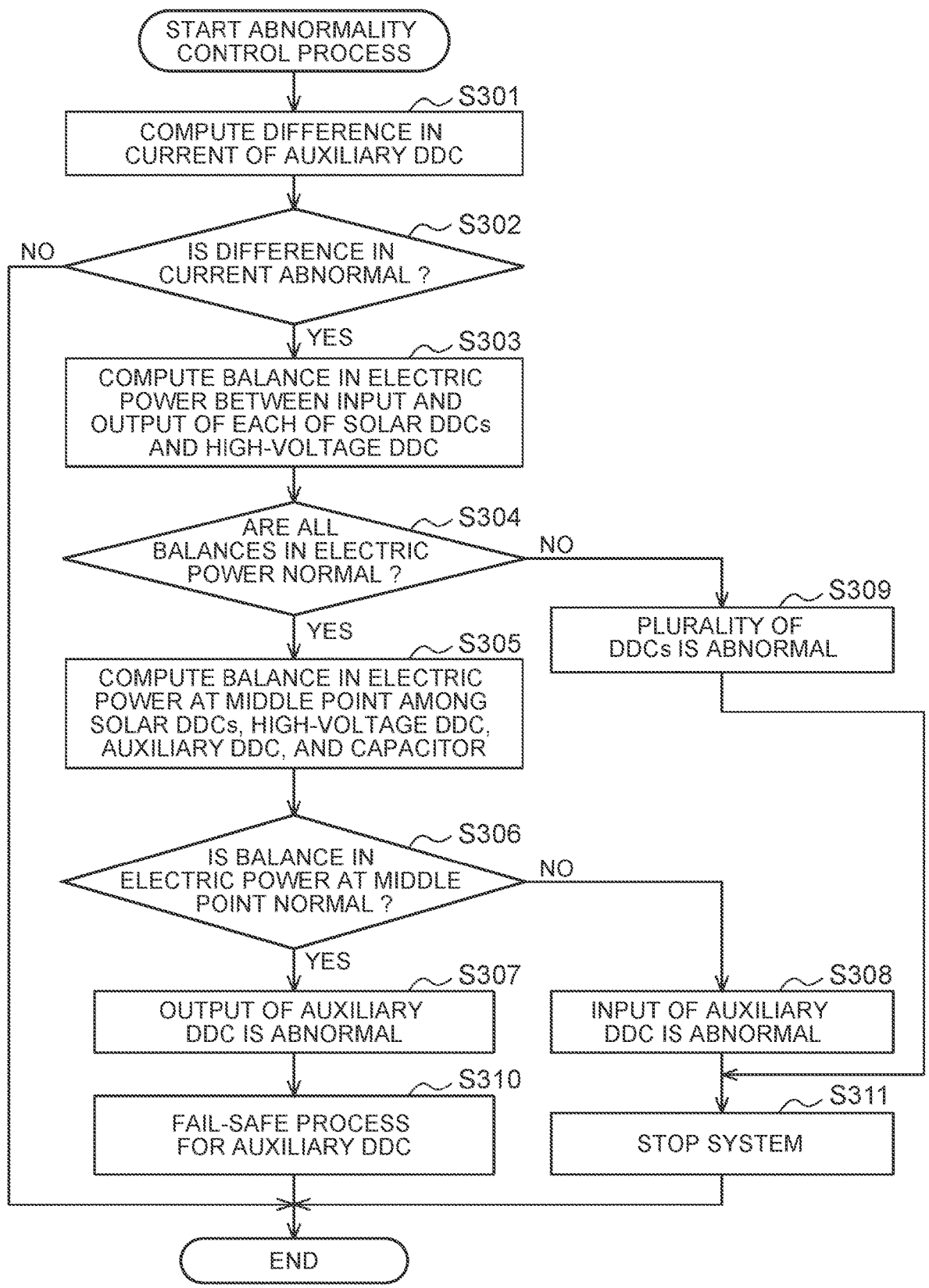
FIG. 3 is a flowchart of an abnormality control process (first example) that is executed by the solar charging system.

FIG. 3 is a flowchart that illustrates a first example of the abnormality control process that is executed by the processing unit 100 of the solar charging system 1. The abnormality control process of the first example shown in FIG. 3 is started when, for example, an ignition of the vehicle is turned on.

Step S301

The processing unit 100 computes a difference in current of the auxiliary DDC 40. A difference in current of the auxiliary DDC 40 is a differential value between a current output from the first converter circuit (M11, M12, L1) of the auxiliary DDC 40 and a current output from the second converter circuit (M21, M22, L2) of the auxiliary DDC 40. The processing unit 100 acquires the value of current detected by the first output current sensor 45 and the value of current detected by the second output current sensor 46 from the auxiliary DDC 40 and computes a current differential value (difference in current) by taking a difference between those values. When the auxiliary DDC 40 is made up of three or more converter circuits connected in parallel, a differential value between any two of currents respectively flowing through the converter circuits is computed. When the difference in current of the auxiliary DDC 40 is computed, the process proceeds to step S302.

Step S302

The processing unit 100 determines whether the difference in current of the auxiliary DDC 40 is abnormal. The determination is performed based on whether the absolute value of the current differential value between the first converter circuit (M11, M12, L1) and the second converter circuit (M21, M22, L2) of the auxiliary DDC 40 exceeds a predetermined threshold. The predetermined threshold may be set to a predetermined value based on a current differential value allowed in a state where the first converter circuit and the second converter circuit both are operating normally in consideration of variations, performances, and the like of the switching elements, inductors, and output current sensors. When the difference in current of the auxiliary DDC 40 is abnormal (YES in step S302), the process proceeds to step S303. When the difference in current of the auxiliary DDC 40 is normal (NO in step S302), the abnormality control process of the first example ends.

Step S303

The processing unit 100 computes a balance in electric power between the input and output of each of the solar DDC 21, the solar DDC 22, and the high-voltage DDC 30. More specifically, the processing unit 100 acquires an electric power (or an input voltage and an input current for derivation) at the input side [A] of the solar DDC 21 and an electric power (or an output voltage and an output current for derivation) at the output side [B] of the solar DDC 21 from the solar DDC 21 and computes a differential value between the acquired input electric power and output electric power as a balance in electric power of the solar DDC 21. The processing unit 100 acquires an electric power (or an input voltage and an input current for derivation) at the input side [C] of the solar DDC 22 and an electric power (or an output voltage and an output current for derivation) at the output side [D] of the solar DDC 22 from the solar DDC 22 and computes a differential value between the acquired input electric power and output electric power as a balance in electric power of the solar DDC 22. The processing unit 100 acquires an electric power (or an input voltage and an input current for derivation) at the input side [E] of the high-voltage DDC 30 and an electric power (or an output voltage and an output current for derivation) at the output side [F] of the high-voltage DDC 30 from the high-voltage DDC 30 and computes a differential value between the acquired input electric power and output electric power as a balance in electric power of the high-voltage DDC 30. At the time of acquiring voltages, the output side [B] of the solar DDC 21, the output side [D] of the solar DDC 22, and the input side [E] of the high-voltage DDC 30 are electrically connected and have the same potential, so any one of the voltages may be used for the other voltages. When the balance in electric power between the input and output of the solar DDC 21, the balance in electric power between the input and output of the solar DDC 22, and the balance in electric power between the input and output of the high-voltage DDC 30 are computed, the process proceeds to step S304.

Step S304

The processing unit 100 determines whether all the balance in electric power between the input and output of the solar DDC 21, the balance in electric power between the input and output of the solar DDC 22, and the balance in electric power between the input and output of the high-voltage DDC 30 are normal. This determination is performed to determine whether the solar DDC 21, the solar DDC 22, and the high-voltage DDC 30 are operating normally. Specifically, when the DC-DC converter is operating normally, the input electric power and the output electric power are substantially equal to each other, so the processing unit 100 compares the input electric power with the output electric power and determines whether the operation is normal or abnormal based on whether the differential value is less than or equal to a predetermined value close to zero. When all the balances in electric power of the DDCs are normal (YES in step S304), the process proceeds to step S305. When at least one of the balances in electric power of the DDCs is not normal (NO in step S304), the process proceeds to step S309.

Step S305

The processing unit 100 computes a balance in electric power at a middle point among the solar DDC 21, the solar DDC 22, the high-voltage DDC 30, the auxiliary DDC 40, and the capacitor 70. More specifically, the processing unit 100 computes a balance in electric power in a power line (middle point) to which the output of the solar DDC 21, the output of the solar DDC 22, the input of the high-voltage DDC 30, the input of the auxiliary DDC 40, and the capacitor 70 are connected. The processing unit 100 acquires an electric power (or an output voltage and an output current for derivation) at the output side [B] of the solar DDC 21, an electric power (or an output voltage and an output current for derivation) at the output side [D] of the solar DDC 22, an electric power (or an input voltage and an input current for derivation) at the input side [E] of the high-voltage DDC 30, an electric power (or an input voltage and an input current for derivation) at the input side [G] of the auxiliary DDC 40, and charge and discharge electric powers (a terminal voltage and input and output currents) of the capacitor 70 and computes a differential value (X−Y) between a sum X of the acquired output electric powers and discharge electric power (=[B]+[D]+(Discharge Electric Power)) and a sum Y of the acquired input electric powers and charge electric power (=[E]+[G]+(Charge Electric Power)) as a balance in electric power at the middle point. Since the voltage at the middle point is the same value (same potential) at any of the output side of the solar DDC 21, the output side of the solar DDC 22, the input side of the high-voltage DDC 30, the input side of the auxiliary DDC 40, and the capacitor 70, even when a balance in current is computed instead of a balance in electric power, it is possible to determine whether the operation is normal or abnormal (described later). When the balance in electric power at the middle point among the DDCs and the capacitor is computed, the process proceeds to step S306.

Step S306

The processing unit 100 determines whether the balance in electric power at the middle point among the solar DDC 21, the solar DDC 22, the high-voltage DDC 30, the auxiliary DDC 40, and the capacitor 70 is normal. This determination is performed to determine whether the abnormality in the auxiliary DDC 40 is occurring on the input side [G] or occurring on the output side [H]. Specifically, when the input side [G] of the auxiliary DDC 40 is normal, an input electric power and an output electric power at the middle point among the solar DDC 21, the solar DDC 22, the high-voltage DDC 30, and the auxiliary DDC 40, determined to be normally operating, are substantially equal to each other, so the processing unit 100 compares the input electric power with the output electric power and determines whether the operation is normal or abnormal based on whether the differential value is less than or equal to a predetermined value close to zero. When the balance in electric power at the middle point is normal (YES in step S306), the process proceeds to step S307. On the other hand, when the balance in electric power at the middle point is abnormal (NO in step S306), the process proceeds to step S308.

Step S307

The processing unit 100 identifies that the abnormality is only in the auxiliary DDC 40 and the location of the abnormality is the output side [H] of the auxiliary DDC 40. When the abnormality location in the auxiliary DDC 40 is identified, the process proceeds to step S310.

Step S308

The processing unit 100 identifies that the abnormality is only in the auxiliary DDC 40 and the location of the abnormality is the input side [G] of the auxiliary DDC 40. When the abnormality location in the auxiliary DDC 40 is identified, the process proceeds to step S311.

Step S309

The processing unit 100 determines that there is an abnormality in the plurality of DDCs. The plurality of DDCs includes the auxiliary DDC 40 and the DDC determined in step S304 that the balance in electric power between the input and the output is abnormal. When the plurality of DDCs in which there is an abnormality is determined, the process proceeds to step S311.

Step S310

The processing unit 100 executes a fail-safe process for the auxiliary DDC 40 in which there is an abnormality at the output side [H]. The fail-safe process will be described later. When the fail-safe process for the auxiliary DDC 40 is executed, the abnormality control process of the first example ends.

Step S311

The processing unit 100 determines not to be able to continue a process of charging electric power generated by the solar panels 11, 12 and stops the solar charging system 1. Thus, the abnormality control process of the first example ends.

Through the process of step S301 to step S311, when there is an abnormality in the solar charging system 1, it is possible to accurately identify the DDC in which there is an abnormality (sensor abnormality, circuit abnormality, or the like). In addition, in the auxiliary DDC 40 that adopts a parallel configuration of converter circuits, it is possible to accurately determine whether the abnormality is occurring at the input side or the output side.

Figure 4:
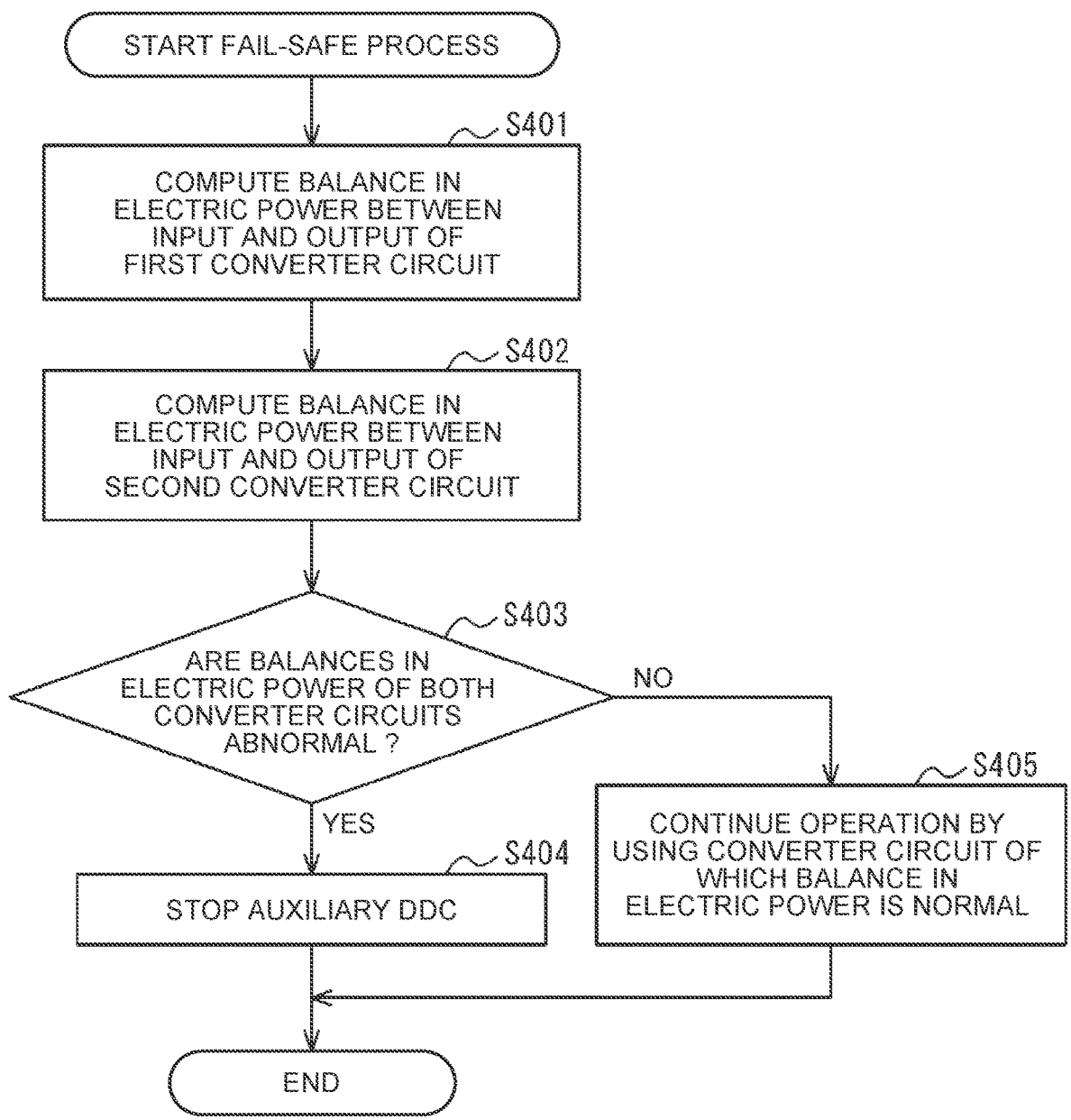
FIG. 4 is a flowchart of an auxiliary DDC fail-safe process that is executed by the solar charging system.

FIG. 4 is a flowchart that illustrates an example of the fail-safe process for the auxiliary DDC 40, which is executed by the processing unit 100 of the solar charging system 1 in step S310 of FIG. 3.

Step S401

The processing unit 100 computes a balance in electric power between the input and the output of the first converter circuit (M11, M12, L1) of the auxiliary DDC 40. More specifically, in a state where the first converter circuit is in operation and the second converter circuit is stopped by the drive circuit 41, the processing unit 100 acquires the voltage of the input voltage sensor 42 and the current of the input current sensor 43 and calculates the input electric power of the first converter circuit, and acquires the voltage of the output voltage sensor 44 and the current of the first output current sensor 45 and calculates the output electric power of the first converter circuit. The processing unit 100 computes a differential value between the calculated input electric power and output electric power as a balance in electric power between the input and the output of the first converter circuit of the auxiliary DDC 40. When the balance in electric power of the first converter circuit is computed, the process proceeds to step S402.

Step S402

The processing unit 100 computes a balance in electric power between the input and the output of the second converter circuit (M21, M22, L2) of the auxiliary DDC 40. More specifically, in a state where the first converter circuit is stopped and the second converter circuit is in operation by the drive circuit 41, the processing unit 100 acquires the voltage of the input voltage sensor 42 and the current of the input current sensor 43 and calculates the input electric power of the second converter circuit, and acquires the voltage of the output voltage sensor 44 and the current of the second output current sensor 46 and calculates the output electric power of the second converter circuit. The processing unit 100 computes a differential value between the calculated input electric power and output electric power as a balance in electric power between the input and the output of the second converter circuit of the auxiliary DDC 40. When the balance in electric power of the second converter circuit is computed, the process proceeds to step S403.

Step S403

The processing unit 100 determines whether both the balance in electric power between the input and the output of the first converter circuit (M11, M12, L1) and the balance in electric power between the input and the output of the second converter circuit (M21, M22, L2) in the auxiliary DDC 40 are abnormal. This determination is performed to determine whether one of the parallel converter circuits is operating normally. Specifically, when the converter circuit is operating normally, the input electric power and the output electric power are substantially equal to each other, so the processing unit 100 compares the input electric power with the output electric power and determines whether the operation is normal or abnormal based on whether the differential value is less than or equal to a predetermined value close to zero. When the balances in electric power of both the converter circuits are abnormal (YES in step S403), the process proceeds to step S404. When the balance in electric power of one of the converter circuits is abnormal (NO in step S403), the process proceeds to step S405.

Step S404

The processing unit 100 identifies both the first converter circuit (M11, M12, L1) and the second converter circuit (M21, M22, L2) as the abnormality locations and stops the auxiliary DDC 40. In other words, the solar charging system 1 is stopped. Thus, the fail-safe process for the auxiliary DDC 40 ends.

Step S405

The processing unit 100 identifies one of the first converter circuit (M11, M12, L1) and the second converter circuit (M21, M22, L2) of the auxiliary DDC 40 as the abnormality location and identifies the other one as being normal. The processing unit 100 continues the operation of solar charging control as the system by using the normally operating converter circuit. When the operation of solar charging control is continued, the fail-safe process for the auxiliary DDC 40 ends.

Through the process of step S401 to step S405, even when there is an abnormality in the solar charging system 1, but when the abnormality location is only one of the parallel converter circuits in the auxiliary DDC 40, it is possible to continue the operation of solar charging control with the system by using the normal converter circuit. With this control, the operating rate of the auxiliary DDC 40 in the fail-safe process improves, so the reliability of the auxiliary DDC 40 of the system is increased.

In the first example, the process in the case where the number of converter circuits is two has been described. When the auxiliary DDC 40 is made up of three or more converter circuits connected in parallel, a balance in electric power between the input and the output of each of the converter circuits may be computed, and it may be determined whether all the balances in electric power are abnormal. It has been described that, in the abnormality control process of the first example, when there occurs a sensor abnormality at the input side [G] of the auxiliary DDC 40 (step S308), the solar charging system 1 is immediately stopped. However, even when there occurs a sensor abnormality at the input side [G] of the auxiliary DDC 40, but when it is determined that any one of the converter circuits of the auxiliary DDC 40 is normal in the fail-safe process, electric power is able to be converted by using the normally operating converter circuit, so it is possible to continue the operation of solar charging control as the system. However, in this case, it is assumed that at least one of the solar DDC 21 and the solar DDC 22 is normal and electric power generated by the solar panels is supplied to the auxiliary DDC 40 by the normal solar DDC.

(2) Second Example

Figure 5:
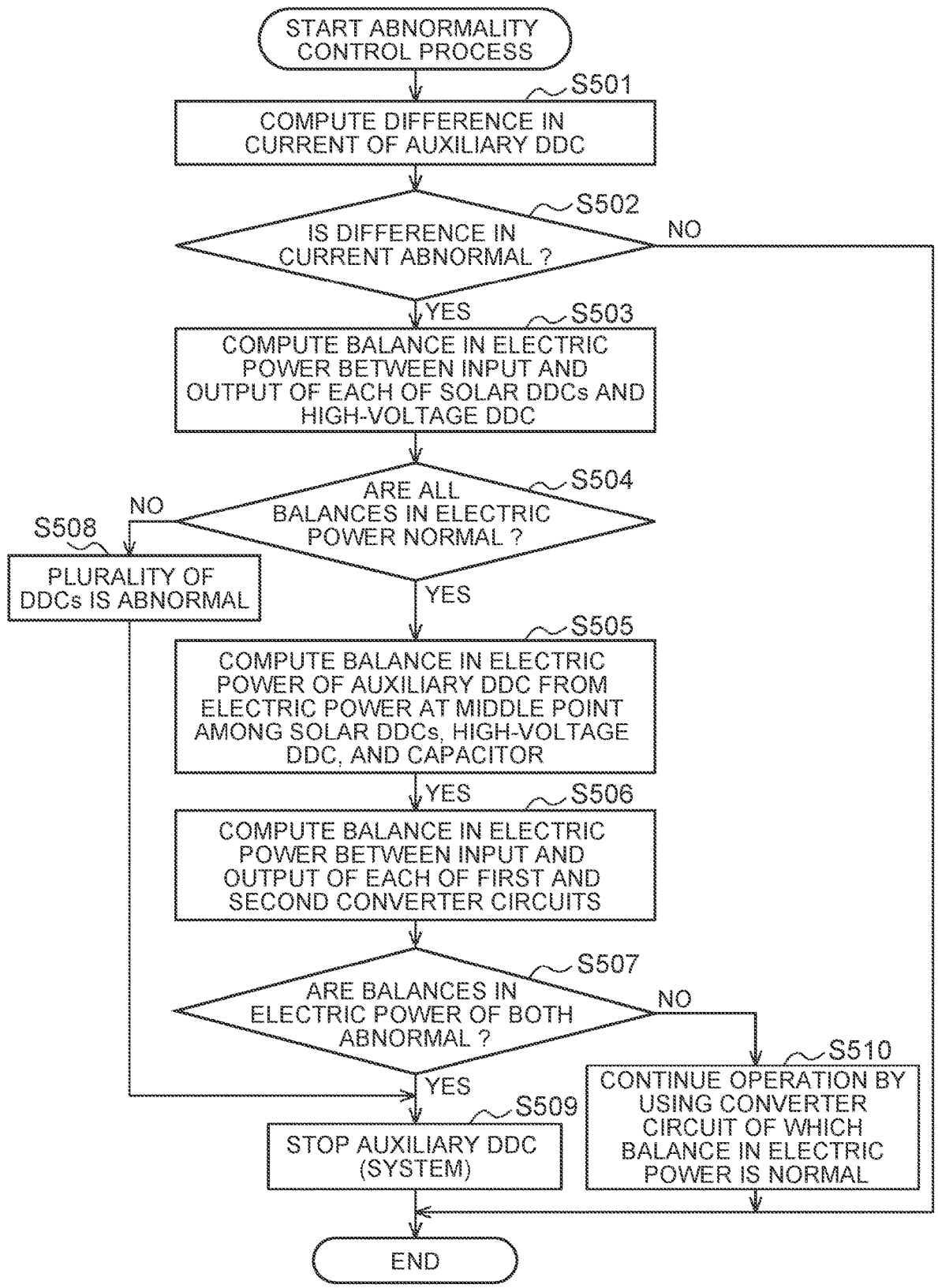
FIG. 5 is a flowchart of an abnormality control process (second example) that is executed by the solar charging system.

FIG. 5 is a flowchart that illustrates a second example of the abnormality control process that is executed by the processing unit 100 of the solar charging system 1.

The second example of the abnormality control process is usable in, for example, the case where the processing unit 100 is not able to acquire a current flowing from the input side [G] of the auxiliary DDC 40, such as the case where the input current sensor 43 (see FIG. 2) of the auxiliary DDC 40 is not provided. The abnormality control process of the second example shown in FIG. 5 is started when, for example, the ignition of the vehicle is turned on.

Step S501

The processing unit 100 computes a difference in current of the auxiliary DDC 40. A difference in current of the auxiliary DDC 40 is a differential value between a current output from the first converter circuit (M11, M12, L1) of the auxiliary DDC 40 and a current output from the second converter circuit (M21, M22, L2) of the auxiliary DDC 40. The processing unit 100 acquires the value of current detected by the first output current sensor 45 and the value of current detected by the second output current sensor 46 from the auxiliary DDC 40 and computes a current differential value (difference in current) by taking a difference between those values. When the difference in current of the auxiliary DDC 40 is computed, the process proceeds to step S502.

Step S502

The processing unit 100 determines whether the difference in current of the auxiliary DDC 40 is abnormal. The determination is performed based on whether the absolute value of the current differential value between the first converter circuit (M11, M12, L1) and the second converter circuit (M21, M22, L2) of the auxiliary DDC 40 exceeds a predetermined threshold. The predetermined threshold may be set to a predetermined value based on a current differential value allowed in a state where the first converter circuit and the second converter circuit both are operating normally in consideration of variations, performances, and the like of the switching elements, inductors, and output current sensors. When the difference in current of the auxiliary DDC 40 is abnormal (YES in step S502), the process proceeds to step S503. On the other hand, when the difference in current of the auxiliary DDC 40 is normal (NO in step S502), the abnormality control process of the second example ends.

Step S503

The processing unit 100 computes a balance in electric power between the input and the output of each of the solar DDC 21, the solar DDC 22, and the high-voltage DDC 30. More specifically, the processing unit 100 acquires an electric power (or an input voltage and an input current for derivation) at the input side [A] of the solar DDC 21 and an electric power (or an output voltage and an output current for derivation) at the output side [B] of the solar DDC 21 from the solar DDC 21 and computes a differential value between the acquired input electric power and output electric power as a balance in electric power of the solar DDC 21. The processing unit 100 acquires an electric power (or an input voltage and an input current for derivation) at the input side [C] of the solar DDC 22 and an electric power (or an output voltage and an output current for derivation) at the output side [D] of the solar DDC 22 from the solar DDC 22 and computes a differential value between the acquired input electric power and output electric power as a balance in electric power of the solar DDC 22. The processing unit 100 acquires an electric power (or an input voltage and an input current for derivation) at the input side [E] of the high-voltage DDC 30 and an electric power (or an output voltage and an output current for derivation) at the output side [F] of the high-voltage DDC 30 from the high-voltage DDC 30 and computes a differential value between the acquired input electric power and output electric power as a balance in electric power of the high-voltage DDC 30. At the time of acquiring voltages, the output side [B] of the solar DDC 21, the output side [D] of the solar DDC 22, and the input side [E] of the high-voltage DDC 30 are electrically connected and have the same potential, so any one of the voltages may be used for the other voltages. When the balance in electric power between the input and the output of the solar DDC 21, the balance in electric power between the input and the output of the solar DDC 22, and the balance in electric power between the input and the output of the high-voltage DDC 30 are computed, the process proceeds to step S504.

Step S504

The processing unit 100 determines whether all the balance in electric power between the input and the output of the solar DDC 21, the balance in electric power between the input and the output of the solar DDC 22, and the balance in electric power between the input and the output of the high-voltage DDC 30 are normal. This determination is performed to determine whether the solar DDC 21, the solar DDC 22, and the high-voltage DDC 30 are operating normally. Specifically, when the DC-DC converter is operating normally, the input electric power and the output electric power are substantially equal to each other, so the processing unit 100 compares the input electric power with the output electric power and determines whether the operation is normal or abnormal based on whether the differential value is less than or equal to a predetermined value close to zero. When all the balances in electric power of the DDCs are normal (YES in step S504), the process proceeds to step S505. When at least one of the balances in electric power of the DDCs is not normal (NO in step S504), the process proceeds to step S508.

Step S505

The processing unit 100 computes the input electric power of the auxiliary DDC 40 from the electric power at the middle point among the solar DDC 21, the solar DDC 22, the high-voltage DDC 30, and the capacitor 70. More specifically, the processing unit 100 acquires an electric power (or an output voltage and an output current for derivation) at the output side [B] of the solar DDC 21, an electric power (or an output voltage and an output current for derivation) at the output side [D] of the solar DDC 22, an electric power (or an input voltage and an input current for derivation) at the input side [E] of the high-voltage DDC 30, and charge and discharge electric powers (a terminal voltage and input and output currents) of the capacitor 70 and computes a value (X−Z) obtained by subtracting a sum Z of the input electric power and the charge electric power (=[E]+(Charge Electric Power)) from a sum X of the acquired output electric powers and discharge electric power (=[B]+[D]+(Discharge Electric Power)) as an electric power at the input side [G] of the auxiliary DDC 40. When the input electric power of the auxiliary DDC 40 is computed, the process proceeds to step S506.

Step S506

The processing unit 100 computes a balance in electric power between the input and the output of the first converter circuit (M11, M12, L1) of the auxiliary DDC 40. More specifically, in a state where the first converter circuit is in operation and the second converter circuit is stopped by the drive circuit 41, the processing unit 100 acquires the voltage of the input voltage sensor 42 and the current of the input current sensor 43 and calculates the input electric power of the first converter circuit, and acquires the voltage of the output voltage sensor 44 and the current of the first output current sensor 45 and calculates the output electric power of the first converter circuit. The processing unit 100 computes a differential value between the calculated input electric power and output electric power as a balance in electric power between the input and the output of the first converter circuit of the auxiliary DDC 40. The processing unit 100 computes a balance in electric power between the input and the output of the second converter circuit (M21, M22, L2) of the auxiliary DDC 40. More specifically, in a state where the first converter circuit is stopped and the second converter circuit is in operation by the drive circuit 41, the processing unit 100 acquires the voltage of the input voltage sensor 42 and the current of the input current sensor 43 and calculates the input electric power of the second converter circuit, and acquires the voltage of the output voltage sensor 44 and the current of the second output current sensor 46 and calculates the output electric power of the second converter circuit. The processing unit 100 computes a differential value between the calculated input electric power and output electric power as a balance in electric power between the input and the output of the second converter circuit of the auxiliary DDC 40. When the balance in electric power of the first converter circuit and the balance in electric power of the second converter circuit are computed, the process proceeds to step S507.

Step S507

The processing unit 100 determines whether both the balance in electric power between the input and the output of the first converter circuit (M11, M12, L1) and the balance in electric power between the input and the output of the second converter circuit (M21, M22, L2) in the auxiliary DDC 40 are abnormal. This determination is performed to determine whether one of the parallel converter circuits is operating normally. Specifically, when the converter circuit is operating normally, the input electric power and the output electric power are substantially equal to each other, so the processing unit 100 compares the input electric power with the output electric power and determines whether the operation is normal or abnormal based on whether the differential value is less than or equal to a predetermined value close to zero. When the balances in electric power of both the converter circuits are abnormal (YES in step S507), the process proceeds to step S509. On the other hand, when the balance in electric power of one of the converter circuits is abnormal (NO in step S507), the process proceeds to step S510.

Step S508

The processing unit 100 determines that there is an abnormality in the plurality of DDCs. The plurality of DDCs includes the auxiliary DDC 40 and the DDC determined in step S504 that the balance in electric power between the input and the output is abnormal. When the plurality of DDCs in which there is an abnormality is determined, the process proceeds to step S509.

Step S509

The processing unit 100 determines not to be able to continue a process of charging electric power generated by the solar panels 11, 12 due to, for example, an abnormality in both the first converter circuit (M11, M12, L1) and the second converter circuit (M21, M22, L2), stops the auxiliary DDC 40, and stops the solar charging system 1. Thus, the abnormality control process of the second example ends.

Step S510

Since one of the first converter circuit (M11, M12, L1) and the second converter circuit (M21, M22, L2) of the auxiliary DDC 40 is operating normally, the processing unit 100 continues the operation of solar charging control as the system by using the normally operating converter circuit (fail-safe process). When the operation of solar charging control is continued, the abnormality control process of the second example ends.

Through the process of step S501 to step S510, when there is an abnormality in the solar charging system 1, it is possible to accurately identify the DDC in which there is an abnormality (sensor abnormality, circuit abnormality, or the like). Even when it is not possible to acquire a current flowing from the input side [G] of the auxiliary DDC 40, but when the location of abnormality is only one of the parallel converter circuits in the auxiliary DDC 40, it is possible to continue the operation of solar charging control with the system by using the normal converter circuit. With this control, the operating rate of the auxiliary DDC 40 in the fail-safe process improves, so the reliability of the auxiliary DDC 40 and the system is increased.

(3) Application Example

The abnormality control processes of the first example and the second example mainly include determining whether there is an abnormality in the auxiliary DDC 40 made up of the parallel converter circuits. However, the solar charging system 1 according to the present embodiment has a configuration in which two panel power generation control units are provided in parallel. Thus, a fail-safe process similar to the fail-safe process for the converter circuits of the auxiliary DDC 40 may be applied to the parallel solar DDCs 21, 22. In other words, when there is an abnormality of a balance in electric power between input and output only in any one of the solar DDC 21 and the solar DDC 22, electric power is able to be supplied by continuing power generation with one of the solar panels by using the normally operating solar DDC. The fail-safe process for the solar DDC is also applicable to the case where only one of the converter circuits is operating in the fail-safe process for the auxiliary DDC 40.

Operation and Advantageous Effects

As described above, with the solar charging system 1 according to the embodiment of the disclosure, when there is an abnormality in the system, it is possible to accurately identify the DC-DC converter in which there is an abnormality (location of abnormality) based on a balance in electric power between the input and the output of each of the solar DDC 21, the solar DDC 22, the high-voltage DDC 30, and the auxiliary DDC 40, a balance in electric power at the middle point, and the like.

In the solar charging system 1 according to the present embodiment, when the auxiliary DDC 40 in which there is an abnormality is made up of parallel converter circuits, it is possible to identify the converter circuit(s) in which there is an abnormality (one or both) based on a difference in current that is a differential value between a current output from the first converter circuit of the auxiliary DDC 40 and a current output from the second converter circuit of the auxiliary DDC 40, a balance in electric power between the input and the output of the first converter circuit, and a balance in electric power between the input and the output of the second converter circuit. Furthermore, when there is an abnormality in only one of the converter circuits, it is possible to continue the operation of solar charging control with the system by using the normal converter circuit, so the operating rate of the auxiliary DDC 40 increases, and the reliability of the auxiliary DDC 40 and the system improves.

The embodiment of the technology of the disclosure has been described; however, the disclosure is not limited to the solar charging system. The disclosure may also be interpreted as a method that is performed by the solar charging system, a program that implements the method, a non-transitory computer-readable storage medium that stores the program, a vehicle that includes the solar charging system, or the like.

The solar charging system of the disclosure is usable in a vehicle or the like that charges a battery with electric power generated by a solar panel.

What is claimed is:

1. A solar charging system comprising:
   a solar panel;
   a first power conversion device configured to
     receive electric power generated by the solar panel, and
     detect or derive an input electric power and an output electric power of the first power conversion device;
   a second power conversion device configured to
     receive electric power output from the first power conversion device, and
     detect or derive an input electric power and an output electric power of the second power conversion device; and
   an electronic control unit configured to, when an abnormality has occurred in the solar charging system, determine whether an abnormality has occurred in at least one of a plurality of first DC-DC converters and a second DC-DC converter based on comparison between the input electric power and the output electric power of the first power conversion device and comparison between the input electric power and the output electric power of the second power conversion device;
   wherein:
   the solar panel is made up of a plurality of panels;
   the first power conversion device is made up of the plurality of first DC-DC converters respectively provided in correspondence with the panels; and
   the second power conversion device includes
     the second DC-DC converter configured to
       detect or derive an input electric power and an output electric power of the second DC-DC converter, and
       output electric power, input from the first power conversion device, to a first battery,
     a third DC-DC converter configured to
       detect or derive an output electric power of the third DC-DC converter, and
       output electric power, input from the first power conversion device, to a second battery;
   the third DC-DC converter is configured such that two or more converter circuits are connected in parallel; and
   the electronic control unit is configured to determine whether an abnormality has occurred in the third DC-DC converter based on a differential value between any two of currents respectively flowing through the two or more converter circuits.

2. The solar charging system according to claim 1, wherein the electronic control unit is configured to, when the electronic control unit determines that an abnormality has occurred in the third DC-DC converter, identify a location of the abnormality in the third DC-DC converter based on comparison between i) a value based on an output electric power of each of the first DC-DC converters and ii) a value based on the input electric power of the second DC-DC converter and the input electric power of the third DC-DC converter.

3. The solar charging system according to claim 2, wherein the electronic control unit is configured to, when the electronic control unit determines that an abnormality has occurred in the third DC-DC converter, identify a converter circuit in which an abnormality has occurred based on comparison between the input electric power and the output electric power of each of the two or more converter circuits.

4. The solar charging system according to claim 3, wherein the electronic control unit is configured to continue control by using the converter circuit in which no abnormality has occurred.

5. The solar charging system according to claim 2, further comprising a capacitor connected between the first power conversion device and the second power conversion device, wherein
   the electronic control unit is configured to, when the electronic control unit determines that an abnormality has occurred in the third DC-DC converter, identify the location of the abnormality in the third DC-DC converter based on comparison between v) a sum of the output electric powers of the first DC-DC converters and a discharge electric power of the capacitor and vi) a sum of the input electric power of the second DC-DC converter, the input electric power of the third DC-DC converter, and a charge electric power of the capacitor.

6. The solar charging system according to claim 2, wherein:
   the two or more converter circuits include a first converter circuit and a second converter circuit; and
   the electronic control unit is configured to, when the electronic control unit determines that an abnormality has occurred in the third DC-DC converter, identify any one of the first converter circuit and the second converter circuit, in which an abnormality has occurred, based on comparison between an input electric power and an output electric power of the first converter circuit and comparison between an input electric power and an output electric power of the second converter circuit.

7. The solar charging system according to claim 1, wherein the electronic control unit is configured to, when the electronic control unit determines that an abnormality has occurred in the third DC-DC converter, identify a location of the abnormality in the third DC-DC converter based on comparison between iii) a value based on a differential value between the input electric power of the second DC-DC converter and a sum of output electric powers of the first DC-DC converters and iv) the output electric power of the third DC-DC converter.

8. The solar charging system according to claim 7, further comprising a capacitor connected between the first power conversion device and the second power conversion device, wherein
   the electronic control unit is configured to, when the electronic control unit determines that an abnormality has occurred in the third DC-DC converter, identify the location of the abnormality in the third DC-DC converter based on comparison between vii) a differential value between a sum of the output electric powers of the first DC-DC converters and a discharge electric power of the capacitor and a sum of the input electric power of the second DC-DC converter and a charge electric power of the capacitor and viii) the output electric power of the third DC-DC converter.

9. A vehicle comprising the solar charging system according to claim 1.

10. A method that is executed by a solar charging system, the solar charging system including
   a solar panel,
   a first DC-DC converter configured to receive electric power generated by the solar panel,
   a second DC-DC converter configured to detect or derive an input electric power and an output electric power of the second DC-DC converter and to output electric power, input from the first DC-DC converter, to a first battery, and
   a third DC-DC converter configured to detect or derive an output electric power of the third DC-DC converter and to output electric power, input from the first DC-DC converter, to a second battery, the method comprising
   when an abnormality has occurred in the solar charging system, identifying a location of the abnormality based on an input electric power and an output electric power of the first DC-DC converter, the input electric power and the output electric power of the second DC-DC converter, and the input electric power and the output electric power of the third DC-DC converter.

* * * * *